United States Patent Office 2,872,241
Patented Feb. 3, 1959

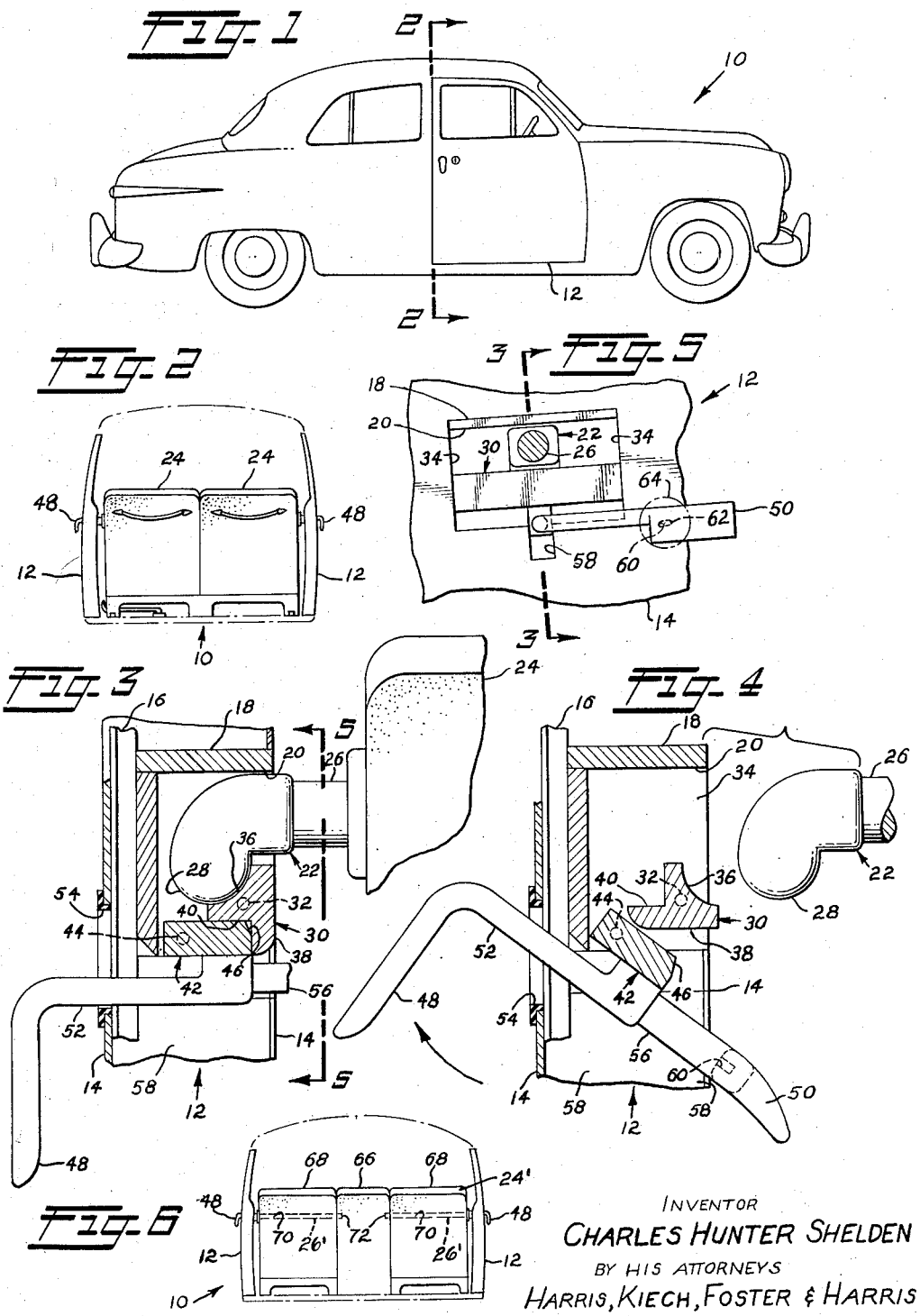

2,872,241

COMBINED DOOR AND SEAT LOCK FOR AUTOMOBILES

Charles Hunter Shelden, Pasadena, Calif.

Application November 19, 1954, Serial No. 469,999

10 Claims. (Cl. 296—65)

The present invention relates to a construction which may be termed a "combined door and seat lock for automobiles."

The basic purpose back of the instant invention is to provide a device which is capable of being used with automobiles in order to reduce certain hazards connected with the use of such vehicles. As virtually every individual knows at the present time, the mortality rate from automobile accidents is exceedingly high, and a great many of these deaths are essentially needless. A large proportion of the fatalities occurring in automobile accidents is due to the door of a car flying open at the time of impact, and the occupants of a car being propelled out through the so opened door. A broad object of the instant invention is to provide constructions which will prevent the opening of such car doors during accidents, and hence will reduce the attendant injuries to the occupants of the car resulting from such occupants' being thrown out through them. A further and related broad object of the instant invention is to provide latch means of this character which can be incorporated easily and conveniently within existing styles of cars, and which are capable of serving other purposes besides merely retaining a door from undesired opening.

One of the other purposes which the construction of the present invention is designed to accomplish is to prevent the front seats of a conventional two-door sedan type car from rotating forward about their mounting points at the time of an accident. When the usual accident occurs, the occupant of the seat of a car is, of course, thrown by virtue of inertia forward towards the steering wheel and/or windshield of a car. The amount of intertia tending to propel such an individual forward is increased by virtue of the fact that the seat back of the usual two-door sedan moves forward with the individual at the time of such an accident. This added force in a forward direction frequently increases the intensity of the injury to the occupant of a car. An aim of the instant invention is to provide a seat lock or seat latch which will prevent forward movement of a foldable car seat such as is found in the usual two-door sedan style automobile towards a forward position, except when the door of a car is opened deliberately.

Another object of the instant invention is to provide devices of the class described in the preceding discussion which are readily adjustable so as to accommodate conventional movement of a car seat to accommodate drivers of different physical dimensions. A still further object of the instant invention is to provide a combined door and seat lock for automobiles which may be connected to handles located exteriorly and interiorly of a car door, which handles are utilized in governing the operation of parts of the instant invention employed to lock both a car door and car seat in a given position. With this type of construction, the handles are preferably utilized both to open and close the car door. A still more detailed object of the invention is to incorporate devices of the class described with a locked mechanism which may be used to lock a car door.

Further objects of the present invention will be apparent in the remainder of the specification and the appended claims.

The actual invention present in this application may be briefly summarized as required by the Rules of Practice of the Patent Office as comprising a knob; means for attaching this knob to a car seat; an opening within a car door; and means for holding said knob within said opening. It will be obvious from the balance of this description that the preferred embodiment of the instant invention is, of course, much more detailed in structure than is specified in this exceedingly brief summary. The actual constructional details involved within a combined door and seat lock of the invention are best apparent with reference to the accompanying drawing, in which:

Fig. 1 is a side view of an automotive vehicle utilizing a preferred embodiment of the instant invention;

Fig. 2 is a partial cross-sectional view taken at line 2—2 of Fig. 1 showing the invention in use;

Fig. 3 is a detailed cross-sectional view taken at line 3—3 of Fig. 5;

Fig. 4 is a cross-sectional view similar to Fig. 3 showing various parts of the invention when a car door is opened;

Fig. 5 is a side view taken at line 5—5 of Fig. 3 of the drawing; and

Fig. 6 is a view similar to Fig. 2 of a modified construction of the present invention.

In all views of the drawing, like numerals are used to designate like parts.

In Fig. 1 there is shown a conventional automative vehicle of the so-called two-door "sedan" type, including doors 12 of an essentially conventional construction. Within these doors there are provided conventional side panels 14 and framing members 16. To each framing member 16 there is attached a substantially rectangular housing 18 which is preferably, but not necessarily, located at a slight incline upwards towards the front of the vehicle 10, as is best seen in Fig. 5. This housing 18 defines an opening 20 facing the interior of the vehicle 10 so that a knob 22 attached to a folding front seat 24 by means of a short bar 26 fits within the housing 18 through the opening 20 when the door 12 is closed.

This knob 22 has a substantially cylindrical lower section 28 which is adapted to be held in place within the housing 18, when such a door 12 is closed, by what may be termed means for locking the knob 22 within this opening. Such means consists of an elongated retaining bar 30 mounted so as to pivot about circular pins 32 held within appropriate openings (not shown) within the ends 34 of the housing 18. This retaining bar has, as is seen in Figs. 3 and 5, a curved side 36 corresponding in size and shape to the lower section 28 of the knob 22, and a flat side 38 which is designed to lie flush with the side panel 14 of the door 12 when the knob 22 is held within the opening 20 by the curved side 36 of the retaining bar 30 contacting the lower section 28 of this knob. It is seen from an examination of Figs. 3 and 4 that because of the curved cylindrical surface of the lower section 28 of the knob 22 and the corresponding shape of the curved side 36 of the retaining bar 30, when the door 12 is moved so that the knob 22 tends to move within the opening 20, this knob will engage the curved side 36 and tend to turn the retaining bar 30 to a final latched position as shown in Fig. 3, from an open position as indicated in Fig. 4. The complete means for locking this knob 22 within the housing 18 is arranged in such a manner that at all times when the door 12 is open, the retaining bar 30 will be in the position shown in Fig. 4.

The retaining bar 30 is provided with a notch 40 which is designed to engage a latch bar 42. This latch bar 42 is held by pins 44 within the housing 18 in a similar manner to the way in which the retaining bar 30 is held within this housing. It is adapted to rotate within the housing so that its axis of rotation is substantially parallel to the axis of rotation of the retaining bar 30. It includes a sloping side 46 so that it may be readily moved into and out of engagement with the notch 40 upon the retaining bar 30. When it is in engagement with this notch, as shown in Fig. 3, it is impossible for the retaining bar 30 to rotate; thus, the knob 22 and the attached seat 24 are rigidly held so that movement, in the event of an accident, on the part of the seat 24 or the door 12 is impossible.

When it is desired to open the door 12, either of two handles 48 or 50 may be actuated so as to disengage the side 46 of the latch bar 42 from the notch 40, permitting rotation of the retaining bar 30. The handle 48, as shown in Figs. 3 and 4 of the drawing, is attached to this latch bar 42 by means of an arm 52 projecting out through an opening 54 formed within a side panel 14 of the door 12. In disengaging the latch bar 42, this handle 48 is pressed, or rotated, in a clockwise direction as viewed in Fig. 3. The other handle 50 is also attached to the latch bar 42 by means of an arm 56 passing through an opening 58 within a side panel 14 of the door 12. In disengaging the latch bar 42, this handle 50 is rotated or lowered in a clockwise direction as viewed in Fig. 3. The arm 56 is provided with an interior cavity 60 (Figs. 4 and 5) which is designed to receive a plunger 62 upon a conventional lock mechanism 64 located within the door 12. With this construction, when the means for locking the knob 22 are in the position shown in Fig. 3 of the drawings with the door 12 closed, it is possible to actuate the lock mechanism 64 so as to push the plunger 62 within this cavity 60. When this is done, rotation of the handles 48 and 50 is impossible, and thus the door 12 is effectively locked. It will be realized from a consideration of Figs. 3 and 4 of the drawing that such rotation corresponds to the rotation of the latch bar 42 with respect to the pins 44.

In Fig. 6 of the drawing, a modified construction of the invention is shown which utilizes essentially the same means for locking a knob as is specified in the above construction. The essential difference between the construction shown in Fig. 6 and the constructions illustrated in Figs. 2, 3, 4 and 5 lies in the fact that the vehicle 10 is provided with a substantially rigid interior center front seat section 66 and with outer foldable front seat sections 68. The bars 26' in the modified construction of Fig. 6 are not rigidly attached to the seat 24', but, instead, are slidably positioned through appropriate openings 70 within the front sections 68 so as to latch in appropriate openings 72 formed in the rigid seat section 66. With this construction, the foldable seat sections 68 are effectively locked on two sides in a given position when the doors 12 of the vehicle 10 are closed. Preferably, spring means are provided so as to extend the bars 26' out of the openings 72 within the rigid seat section 66 when the doors 12 are opened. The closing of these doors will, of course, operate against such spring means tending to force the bars 26' into positions substantially as indicated in Fig. 6 of the drawing.

One feature of the instant invention which deserves to be mentioned lies in the fact that it is readily adaptable to a wide variety of cars, and, further, does not limit the movement of the front seat so as to accommodate various drivers. The opening 20, as shown in Fig. 5 and described in the preceding discussion, is substantially elongated in character, and preferably slopes upwards towards the front of a car. Thus, as the seat 24 within such a car is moved so as to place the driver of the vehicle 10 nearer or farther from the controls of such a vehicle, the seat will at all times be located with the knob 22 within the opening 20. The particular slant previously discussed is advisable inasmuch as when the seat 24 is moved so as to accommodate a comparatively small person, such a seat is generally moved forward and slightly upwards.

It will be obvious from the foregoing description that a number of minor modifications may be made within the essential features of the inventive concept herein described. All such modifications which are within the skill of the art are to be considered as part of the inventive concept insofar as they fall within the scope of the appended claims.

I claim as my invention:

1. In an automotive vehicle having doors and seats capable of being moved from a normal operative position to a folded position, the improvement which comprises: means defining an opening attached to a door; a knob connected to the folding portion of a seat adjacent the upper edge thereof, said knob being adapted to fit within said opening; and means for locking said knob within said opening.

2. A device as defined in claim 1, wherein said knob is rigidly secured to said folding portion of said seat.

3. In a device of the class described which is designed to be utilized in automotive vehicles in order to prevent the doors of such vehicles from flying open and to prevent foldable seats within such vehicles from moving to a folded position in the event of an accident, a construction which comprises: a housing mounted in a car door and having an opening therein; a knob adapted to be secured to the folding portion of a foldable seat within the vehicle and adapted to pass through said opening into said housing; a retaining bar mounted within said housing and pivotal in a plane substantially perpendicular to the plane of the door, said retaining bar being adapted to engage said knob so as to prevent said knob from moving from said housing; and a latch bar pivotally mounted relative to said housing and adapted to engage said retaining bar so as to prevent movement of said retaining bar, locking said retaining bar in a given position in order to hold said knob within said housing.

4. A device as defined in claim 3, wherein handle means are attached to said latch bar, said handle means being designed to be used in moving said latch bar so as to permit movement of said retaining bar, allowing said knob to be moved out of said housing.

5. In an automotive vehicle, a combined door and movable seat lock designed to prevent undesired movement of said door and said seat relative to said vehicle, which comprises: means defining a housing within said door, said housing including an opening facing the interior of said automotive vehicle; a knob having a substantially cylindrical lower section attached to that portion of said seat which is movable relative to said vehicle so as to project through said opening into said housing when said door is in a closed position; a retaining bar rotatably mounted within said housing, said retaining bar including a curved side corresponding in shape to the shape of said cylindrical lower section of said knob, said curved side being adapted to engage said cylindrical lower section when said knob is moved into and out of said housing so as to rotate said retaining bar; latch means rotatably mounted within said housing, said latch means being so positioned as to engage said retaining bar and prevent rotation thereof when brought into an operative position in contact with said retaining bar; and handle means attached to said latch means so as to project from both sides of said door.

6. In a device as defined in claim 5, lock means adapted to engage said handle means so as to prevent movement of said handle means, said latch bar and said retaining bar.

7. A door and seat lock for use in automobile vehicles to prevent the doors of such vehicles from flying open and to prevent foldable seats within such vehicles from moving to a folded position in the event of an accident, which comprises: means defining a housing within said door, said housing including an opening facing the interior of said automotive vehicle; a knob having a curved end section, said knob being adapted to be secured to the folding portion of a foldable seat so as to project through said opening into said housing when said door is in closed position; a retaining bar mounted within said housing, said retaining bar including a curved side corresponding in shape to the shape of said curved section of said knob, said curved side being adapted to engage said curved end section when said knob is moved into and out of said housing so as to move said retaining bar; latch means rotatably mounted within said housing, said latch means being so positioned as to engage said retaining bar and prevent rotation thereof when brought into an operative position in contact with said retaining bar; and handle means attached to said latch means so as to project from both sides of said door.

8. In an automotive vehicle having a door pivotally mounted thereon and a seat capable of being moved from a normal operative position to a folded position, the folding portion of the seat being disposed substantially perpendicular to the door when the door is closed, the improvement which comprises: means defining an opening attached to the door; a bar mounted in the folding portion of the seat; a knob secured to said bar, said knob being adapted to fit within said opening, said bar being free to reciprocate through the seat along an axis substantially perpendicular to the door when closed so as to engage a rigid member when said knob is positioned within said opening, blocking two sides of the foldable seat against rotation; and means for locking said knob within said opening.

9. In an automotive vehicle having doors and seats capable of being moved from a normal operative position to a folded position, the improvement which comprises: means defining an opening attached to a door; a knob connected to the folding portion of a seat, said knob being adapted to fit within said opening; and means for locking said knob in said opening, said opening being elongated so as to accommodate said knob in any of a variety of operative positions of the seat.

10. A vehicle having a seat, a pivotal normally erect seat back and a door adjacent the seat back controlling access to the seat, in combination with latching means for retaining the seat back in the erect position when the door is closed, comprising a projection mounted on the seat back, and a slot for the projection mounted on the door, said projection entering the slot when the door is closed and leaving the slot when the door is opened.

References Cited in the file of this patent

UNITED STATES PATENTS

| | | |
|---|---|---|
| 1,899,234 | De Werth | Feb. 28, 1933 |
| 2,032,821 | Waits | Mar. 3, 1936 |
| 2,387,187 | Smith | Oct. 16, 1945 |
| 2,559,548 | Seigneur | July 3, 1951 |
| 2,624,613 | Parmely | Jan. 6, 1953 |

FOREIGN PATENTS

| | | |
|---|---|---|
| 16,285 | Great Britain | July 12, 1912 |
| 633,717 | France | Oct. 29, 1927 |
| 733,858 | France | July 18, 1932 |
| 1,068,226 | France | Feb. 3, 1954 |